(12) United States Patent
Heikell

(10) Patent No.: US 10,423,885 B2
(45) Date of Patent: *Sep. 24, 2019

(54) SYSTEMS, METHODS AND APPARATUS FOR EVALUATING STATUS OF COMPUTING DEVICE USER

(71) Applicant: Timothy P. Heikell, Renton, WA (US)

(72) Inventor: Timothy P. Heikell, Renton, WA (US)

(73) Assignee: Timothy P. Heikell, Renton, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/457,099

(22) Filed: Mar. 13, 2017

(65) Prior Publication Data

US 2018/0012138 A1 Jan. 11, 2018

Related U.S. Application Data

(63) Continuation of application No. 12/313,502, filed on Nov. 19, 2008, now Pat. No. 9,595,008.

(60) Provisional application No. 61/003,743, filed on Nov. 19, 2007.

(51) Int. Cl.
*G06N 7/00* (2006.01)
*G06F 21/50* (2013.01)
*G06F 21/31* (2013.01)

(52) U.S. Cl.
CPC ........... *G06N 7/005* (2013.01); *G06F 21/316* (2013.01); *G06F 21/50* (2013.01); *G06F 2221/2133* (2013.01)

(58) Field of Classification Search
USPC ......................................................... 706/52
See application file for complete search history.

(56) References Cited

U.S. PATENT DOCUMENTS

| | | | | |
|---|---|---|---|---|
| 5,933,498 A * | 8/1999 | Schneck | .................. | G06F 21/10 705/54 |
| 6,460,141 B1 * | 10/2002 | Olden | .................. | G06F 21/604 726/12 |
| 7,506,170 B2 * | 3/2009 | Finnegan | ................ | G06F 21/31 713/162 |
| 8,694,244 B2 | 4/2014 | Schalk | | |
| 8,700,259 B2 | 4/2014 | Schalk | | |
| 8,706,405 B2 | 4/2014 | Schalk | | |

(Continued)

OTHER PUBLICATIONS

IEEE Combined Web/mobile authentication for secure Web access control A. Al-Qayedi; W. Adi; A. Zahro; A. Mabrouk Published in: 2004 IEEE Wireless Communications and Networking Conference (IEEE Cat. No. 04TH8733) Date of Conference: Mar. 21-25, 2004 IEEE.*

(Continued)

*Primary Examiner* — Michael B Holmes
(74) *Attorney, Agent, or Firm* — Lee & Hayes, P.C.

(57) ABSTRACT

Methods, systems and apparatus for assessing the likely status of an operator of a computing device interacting with a server as a human operator or an autonomic computer application, such as a "bot" are described herein. By monitoring at least some data, e.g., biometric data, generated at the client computing device, a comparison can be made between the monitored data and model data relating to human interaction with the computing device. The results of the comparison can lead to a value that represents the likelihood that the monitored data results from human interaction.

20 Claims, 4 Drawing Sheets

(56) References Cited

U.S. PATENT DOCUMENTS

| | | | |
|---|---|---|---|
| 8,713,657 B2* | 4/2014 | Lee | G06F 21/46 726/7 |
| 8,738,287 B2 | 5/2014 | Schalk | |
| 8,775,235 B2 | 7/2014 | Hedley et al. | |
| 8,775,236 B2 | 7/2014 | Hedley et al. | |
| 8,824,659 B2 | 9/2014 | Bushey et al. | |
| 8,825,379 B2 | 9/2014 | Schalk | |
| 8,903,052 B2 | 12/2014 | Moore et al. | |
| 9,047,458 B2* | 6/2015 | Etchegoyen | G06F 21/31 |
| 9,088,652 B2 | 7/2015 | Bushey et al. | |
| 9,152,381 B2 | 10/2015 | Valentino et al. | |
| 9,208,461 B2 | 12/2015 | Busa | |
| 9,240,078 B2 | 1/2016 | Hedley et al. | |
| 9,595,008 B1* | 3/2017 | Heikell | G06N 7/005 |
| 2008/0225870 A1 | 9/2008 | Sundstrom | |
| 2009/0197815 A1 | 8/2009 | Vincenzi et al. | |
| 2013/0019290 A1* | 1/2013 | Lee | G06F 21/46 726/6 |

OTHER PUBLICATIONS

McCausland et al., "A Proactice Risk-Awar Robitic Sensor Network for Critical Infrastructure Protection", IEEE International Conference on Computational Intelligence and Virtual Environments for Measurement Systems and Applications (CIVEMSA), Apr. 2013, pp. 132-137.

Office action for U.S. Appl. No. 12/313,502, dated Sep. 16, 2011, Heikell, "Systems, Methods and Apparatus for Evaluating Status of Computing Device User", 9 pages.

Pal et al., "Trust Assessment from Observed Behavior: Toward and Essential Service for Trusted Network Computing", Fifth IEEE International Symposium on Network Computing and Applications (NCA'06), Jul. 2006, pp. 285-292.

Temple et al., "Testability Modeling and Analysis of a Rocket Engine Test Stand", IEEE Aerospace Conference, Jan. 2005, pp. 3874-3895.

"Fingerprint Reader: Replace Passwords with Your Fingerprint" retrieved on the internet on Aug. 16, 2018 at <<https://web.archive.org/web/20061230123302/http:://www.microsoft.com/hardware/houseandkeyboard/productdetails.aspxZpid=036>> 1 page.

"Microsoft Fingerprint Reader" retrieved from the internet on Aug. 16, 2018 at <<https//en.wikipedia.org/wikiMicrosoft_Fingerprint_Reader>>, 2 pages.

"Microsoft Fingerprint Reader" retrieved from the internet on Aug. 16, 2018 at <<https://web.archive.org/web/20060913000000/http://en.wikipedia.org:80/wikiMicrosoft_Fingerprint_Reader>> 1 page.

"Most people have at least 15 username and password combinations to remember" retrieved from the internet on Aug. 16, 2018 at <<https://web.archive.org/web/20050111041404/http://www.microsoft.com:80/hardware/mouseandkeyboard/features/docs/fingerprint.html>> 12 pages.

"Researcher Hacks Microsoft Fingerprint Reader" retrieved from the internet on Aug. 16, 2018 at <<https://www.pcworld.com/article/124978/article.html>> 3 pages.

"Tired of passwords? Replace them with your fingerprint" retrieved from the internet on Aug. 16, 2018 at <<https://web.archive.org/web/20040926002804/http://www.microsoft.com:80hardware;mouseandkeyboard/features/fingerprint.mspx>>, 1 page.

* cited by examiner

SYSTEMS, METHODS AND APPARATUS FOR EVALUATING STATUS OF COMPUTING DEVICE USER

This application claims priority to application Ser. No. 12/313,502 filed Nov. 19, 2008, which claims priority to provisional application Ser. No. 61/003,743 filed Nov. 19, 2007, both of which are incorporated herein by reference.

BACKGROUND

The Internet is a fantastic tool for constructive web sites to gather users for a common purpose; however, the Internet is also a fantastic tool for abuse of these same web sites. People who want to take advantage of websites do so by creating automated programs employing various algorithms and routines (hereinafter "bots") that create fictitious accounts or access content for a multitude of reasons.

In an effort to block these bots, builders of web sites have created a variety of tests to determine if the user is a bot or if the user is a human. Initial efforts required a user to simply enter an alphanumeric string into an input field. However, as character recognition engines became more available, such "tests" became easily defeated. What was needed was a more robust form of test—one that couldn't be easily defeated.

Carnegie Mellon University coined the term "CAPTCHA" (Completely Automated Public Turing test to tell Computers and Humans Apart) for these types of tests. A common type of CAPTCHA requires that the user type the letters, digits or characters of a distorted image appearing on the screen. The objective is to create an image that a bot cannot easily parse but that is discernable by a human. Such efforts have been successful in preventing non-adaptive software from recognizing the imaged characters, but people intent on abusing these sites have designed ways to circumvent the CAPTCHA, such as through specially tuned character recognition programs. A brief survey of the Internet will reveal many resources that describe how to tune and/or use character recognition to decipher CAPTCHA including aiCaptcha, Simon Fraser University and PWNtcha.

The result of the foregoing is that while CAPTCHAs are becoming increasingly more difficult for bots, they are also becoming more difficult and/or burdensome for human users. In certain instances, the desire to defeat the bots has resulted in images that are so distorted that some human users cannot decipher the images. This is particularly true with users having a visual deficiency or imparity. As a partial solution to this escalation of perception difficulty, some web sites have begun adding a link to a sound file that will speak the characters, but these sound files are also being drastically distorted to protect against being discerned by bots through speech pattern matching algorithms. Other web sites like Facebook.com, have gone so far as to adopt a practice requiring deciphering two distorted word images to increase the complexity for bots. While perhaps achieving the stated objective, the collateral effect is to exacerbate the existing burden to human users.

Current CAPTCHA technology is visual or auditory in nature, requiring the human user to answer a test that should be simple to most humans but difficult for non-humans, e.g., bots. Visual CAPTCHA using distorted images is widely used as the primary test by nearly every top Internet site including Yahoo, Google, You Tube, Microsoft's Live ID, MySpace, Facebook, Wikipedia, Craigs List. By using solely visual testing criteria, nearly all users will be able to invoke the requested action; not all users have functioning audio equipment or environments such as libraries may not permit such use.

A positive user experience is critical to the success and increased popularity of a given website. Designers of web sites go to great lengths to ensure their website is as user friendly as possible. Carnegie Mellon University estimates that 60 million CAPTCHA tests are deciphered every day and with an average time spent of 10 seconds, requiring a total of 150,000 hours of work spent every day trying to protect web sites from bots. Reducing or eliminating the requirement of a user having to decipher CAPTCHA is one more way websites can create a more positive user experience for their visitors and minimize opportunity costs.

SUMMARY OF THE INVENTION

Figure 1:
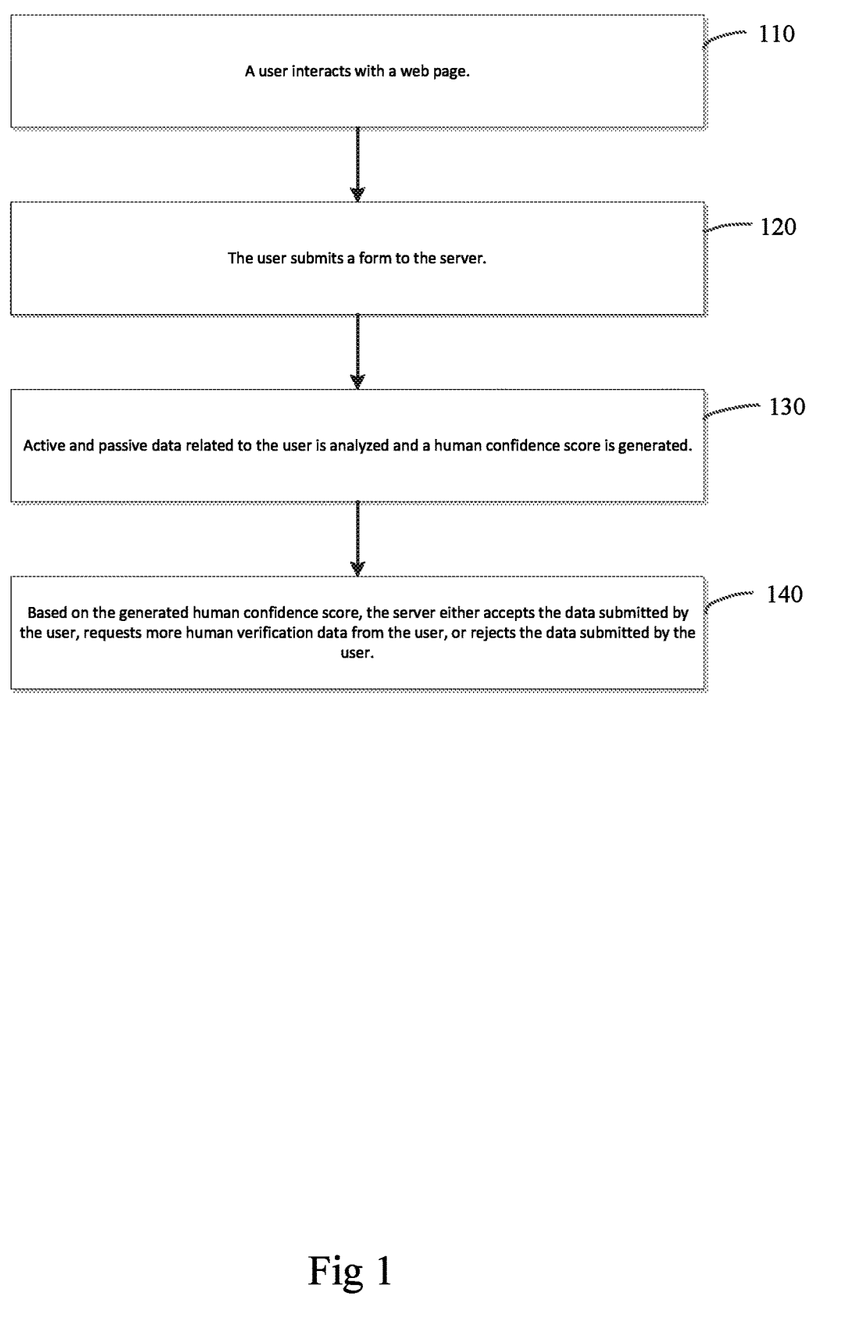
FIG. 1 illustrates an overview of the process described in this disclosure.
Figure 3:
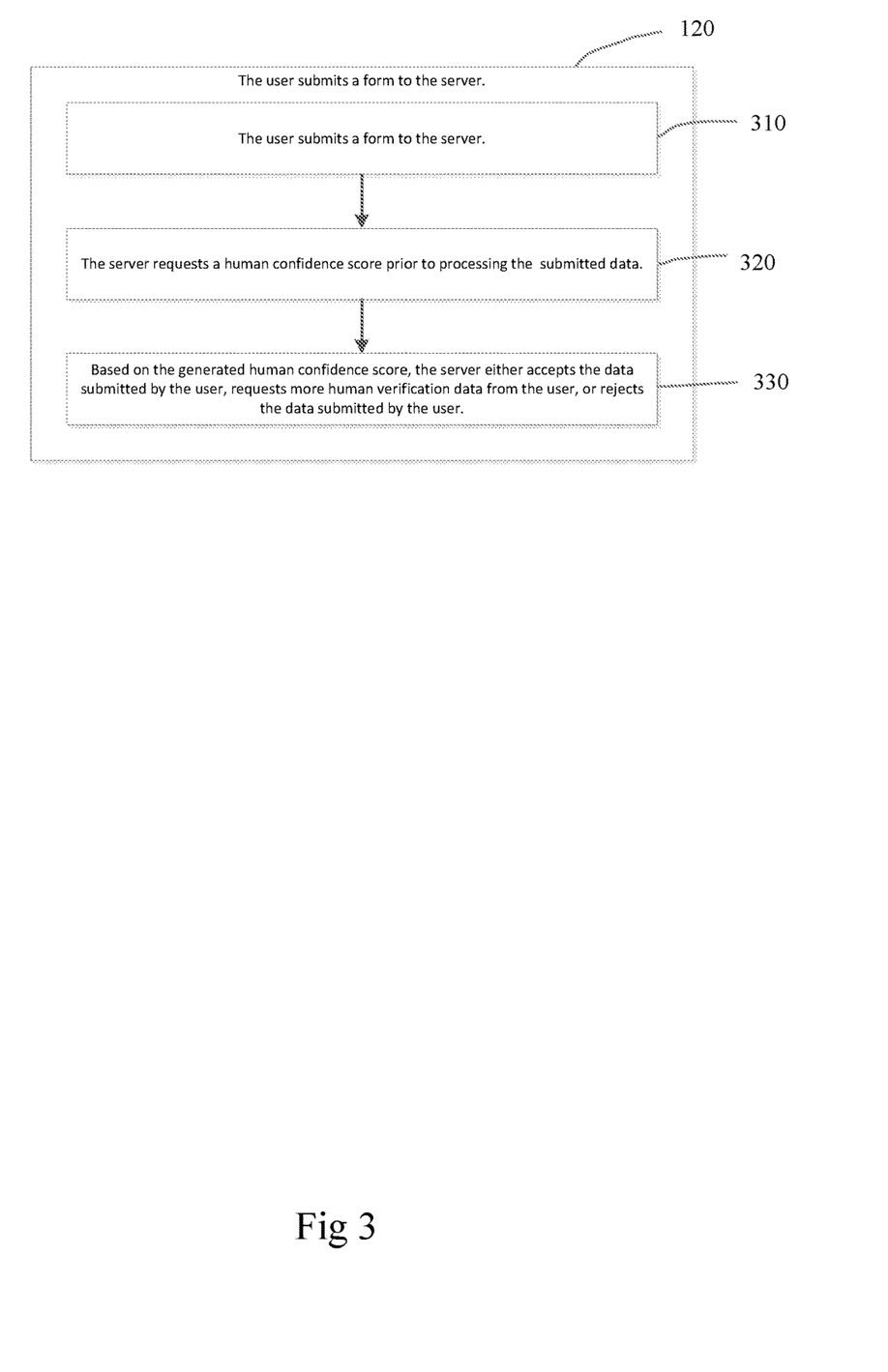
FIG. 3 illustrates in more detail the second step 120 of FIG. 1 (the user submits a form to the server).

The invention is generally directed to methods, systems and apparatus for assessing the likely user status of a computing device interacting with a server where computing device is in bi-directional operative communication with the server wherein the status is one of a human operator or a computer executable program (also referred to herein as a "bot"). This assessment comprises comparing acquired and/or available data relating to the operation of the computing device to suitable models embodying human user derived data (model data). In most embodiments, the comparison yields a probability value as to one of the status states 140, 330, which then may be used by a program or administrator of the server to permit or deny access and/or operation to the computing device. Because many of the invention embodiments provide a probability result as opposed to a binary result, the invention embodiments avoid the "there is only one right answer" phenomena inherent in prior art CAPTCHA tests. In other words, rather than placing the burden of proof on the user for functionality/access, which if the user is a human invokes the negative consequences of conventional CAPTCHA tests as previously described, the burden is shifted to the server side of the equation.

BRIEF DESCRIPTION OF THE DRAWINGS

The detailed description is described with reference to the accompanying figures. The use of the same reference numbers in different figures indicates similar or identical components or features.

DETAILED DESCRIPTION

Figure 2:
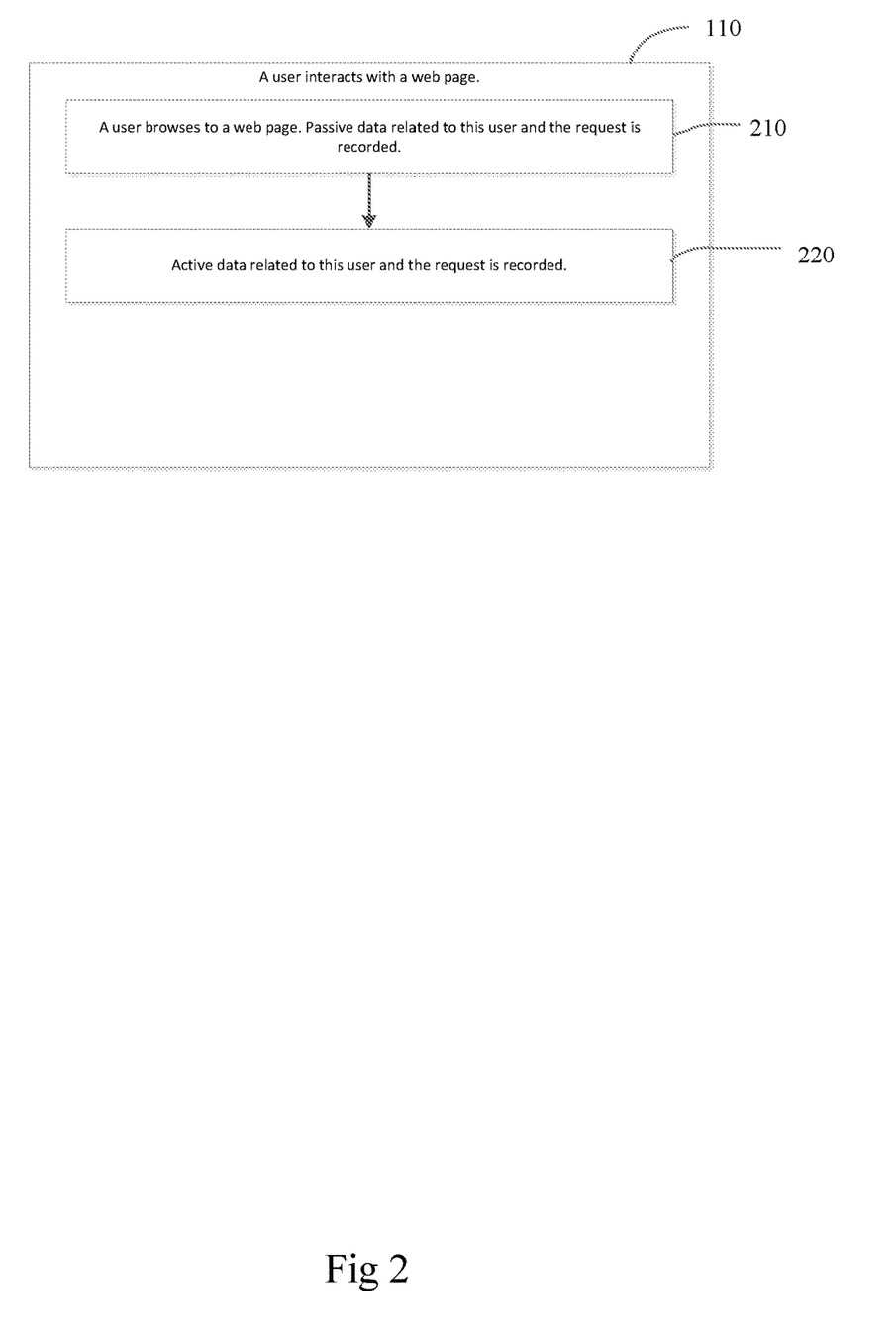
FIG. 2 illustrates in more detail the first step 110 of FIG. 1 (a user interacts with a web page).

As used herein, "model data", its equivalents and verb forms comprises data indicative of human interaction with a computing environment and that can be received by a computing device that is physically remote from the sample computing environment and equivalents. Model data comprises two main categories: active model data 220 and passive model data 210. Active model data comprises data acquired from a computing device user's interactions therewith and within the computing environment where such data is not normally stored (logged) or transmitted to a remote location. Such model data includes, without limitation, pointing device vector movements and/or cadence, key stroke combinations and/or cadence, time differentials between stimulus (e.g., display of dialog box, radio button, form field, etc., and/or generation of sound) and user response (e.g., input into dialog box, selection of radio button, completion of form field, new page display request rates, etc., and/or input response to sound), and similar metrics. Generally, such data must be monitored and stored 210, 220 by a program operative on the computing device, which makes the data available to another program, preferably on a server 320, or actively transmits such data to a server. Passive model data comprises data available from a computing device user's interactions therewith and within the computing environment where such data is normally stored (logged) or transmitted to a remote location. Such model data includes, without limitation, browser cookies, destination IP histories, originating IP address, originating IP address traffic data, originating IP address physical location, third party data regarding abusers (including originating IP addresses and physical locations), etc.

Also as used herein, the term "available data" its equivalents and verb forms comprises data associated with a computing device's operation and its interaction with a computing environment, such as the Internet, that is generally recorded within the computing device and/or by other devices that have been affected by the computing device's operation—this is also a type of passive data; the term "acquired data", its equivalents and verb forms comprises data associated with a computing device's operation and its interaction with a computing environment, such as the Internet, that is generally not recorded within the computing device and/or by other devices that have been affected by the computing device's operation, but at least some data of which has/have been recorded and/or transmitted to a remote location, such as a server—this is a type of active data.

In addition to the foregoing, the term "issued data", its equivalents and verb forms comprises data generated by a server or other computing device that is not the same as the computing device for which the assessment as to user status is being performed "monitored data", its equivalents and verb forms comprises active or passive data, whether available or acquired, obtained from the computing device, or as a result of its external interactions, after the generation of issued data "interest data", its equivalents and verb forms comprises active or passive data, whether available or acquired, that correlates to any data within model data, whether obtained prior to or after the generation of issued data. Thus, interest data includes time independent available data and acquired data, unless qualified differently.

Figure 4:
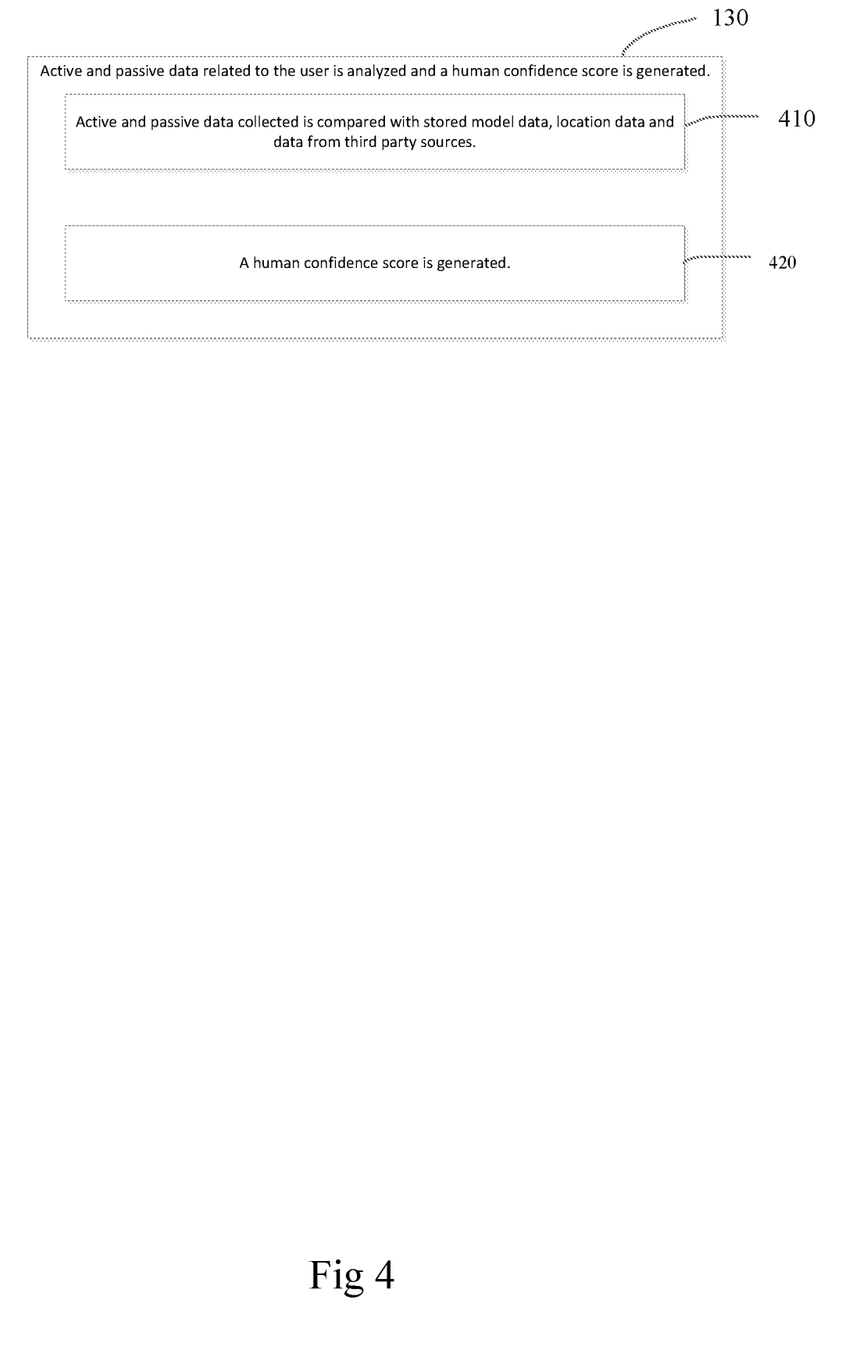
FIG. 4 illustrates in more detail the third step 130 of FIG. 1 (active and passive data related to the user is analyzed and a human confidence score is generated).

With the foregoing definitions in mind, operation of the various invention embodiments can be better understood. In a first series of embodiments, a comparison between interest data, acquired prior to delivery of issued data to the client computing device, and model data is performed to ascertain the likely status of the client computing device, i.e., human user or bot 130, 420. In a second series of embodiments, a comparison between monitored data, by definition acquired after delivery of issued data to the client computing device, and model data is performed to ascertain the likely status of the client computing device, i.e., human user or bot 130, 420. In both series of embodiments, acquired and/or available data may be used for comparison with suitable model data. The recited comparisons can take place locally on the computing device, remotely on the originating server, or on a server dedicated to performing such actions and for which subscriptions may be offered in conjunction with methods for providing services according to the methods, apparatus and systems embodiments described herein.

While available data represents data that is readily harvestable by query, for example, from the computing device or the computing environment in which the device operates, acquired data requires some form of information capture means. In the various embodiments described herein, the computing device is caused to monitor and retain certain data useful as acquired data for comparison purposes. Such monitoring and retaining means for acquiring data from the computing device comprises, without limitation, modification of (an) existing program(s) (e.g., such means are included in available browsers), a covert program (e.g., many malware applications log keystrokes and periodically pass them to remote servers for malicious purposes; similar technology can be used to exploit necessary aspects of the invention embodiments), or a servlet/Java applet. If user privacy is a concern, the monitoring and retaining means can remain dormant until activated by, for example, an enabled web site 110.

The monitoring and retaining means may also enable transmission of some or all retained data 410, in encrypted or unencrypted form, as may be desired for privacy and security purposes, and/or merely retain the data until requested from, for example, the server, at which time some or all data may be transmitted 120, 310. As described above with reference to the comparison actions 130, 410, such receiving and/or polling actions can be carried out remotely on the originating server or on a server dedicated to performing such actions, if not performed locally on the computing device.

From the foregoing, it can be seen that implementation of the invention embodiments can be accomplished exclusively from the server side; it is not necessary to distribute or install in the conventional sense client side software. Existing available browsers and operating systems provide the means necessary to temporarily install logging code, if such is elected. Moreover, the methods, and associated systems and apparatus, described herein are highly transparent to the user, thereby achieving an objective of enhancing the user's experience of a web site employing bot assessment protocols.

DESCRIPTION OF AN INVENTION EMBODIMENT

A primary objective of bot creation is to autonomously access data and/or functionality of a target server as quickly as possible. By assessing user biometrics having a time domain, the time variable becomes a necessary component to accessing the data and/or functionality of the server. Because such assessment has heretofore been absent as a valid CAPTCHA marker of a human user, and more importantly because proper data input would necessarily slow the process, the likelihood of bot penetration has been significantly reduced.

An embodiment of the invention employs a first layer of testing that simply checks if there were valid mouse movements and/or key strokes inputted by the user of a computing device that is attempting to access a server resource "protected" from bots. This basic "if-then" check is essentially without overhead since there are no computations being carried out. Checking for the existence of the target activity therefore represents a first pass evaluation; if the bot is not programmed to include pseudo biometric data, further access is denied. In other words, if no activity is recorded there is a very high probability that the user is actually a bot.

A fundamental premise of robust biometrics is that a given dataset for each person is unique. Therefore, if the dataset is sufficiently robust, it is impossible to have duplicative input data unless the input data was derived from a machine. Exploiting this premise allows a second level knockout assessment to deny user access if the input data exactly (or statistically sufficiently) matches previously recorded data. Of course, the skilled practitioner employing this method can select (either explicitly or via programming) sample points of a dataset for comparison as opposed to all data, thereby reducing computational overhead and storage issues. Alternatively, if samples are used, an exact match could then invoke a more intensive comparison with the same stored datasets, where again access can be denied when an exact or statistically sufficient match is found.

In the foregoing two assessments, an object has been to ferret out bots in an efficient and low overhead manner by exploiting intrinsic design limitations. However, it is possible that a bot designer could spoof these assessment means by, for example, running many bots in parallel wherein intrinsic delays in CPU processing and bandwidth would introduce inherent time delays associated with the very inputs being assessed. Therefore, more robust assessment means may be employed to ascertain the presence of a bot.

In robust embodiments of the invention, a third layer of testing may be employed that compares recorded pointer movements and key strokes to previously recorded activity for a given input page that was knowingly created by humans. Thus, as input data is collected for a given page, patterns will emerge that are unique to human activity. Subsequently recorded activity that is inconsistent with these patterns would indicate the potential that the user is a bot. Access could then be denied, or further CAPTCHA tests presented. Alternatively, access could be granted since no lock is pick proof and an object of the invention embodiments is to minimize user exposure to CAPTCHA tests.

What is claimed:

1. A method comprising:
    testing for a presence of biometric data associated with an operator of a computing device attempting to access a server;
    controlling access to the server by at least one of:
        denying access of the computing device attempting to access the server when the biometric data is not present; or
        not denying access of the computing device attempting to access the server when some biometric data is present.

2. A method as claim 1 recites, wherein the biometric data includes at least one of mouse movement or keystrokes associated with the computing device.

3. A method as claim 1 recites, further comprising identifying whether the biometric data matches previously recorded biometric data.

4. A method as claim 3 recites, further comprising providing a Completely Automated Public Turing test to tell Computers and Humans Apart (CAPTCHA) to the computing device attempting to access the server when the biometric data matches previously recorded biometric data.

5. A method as claim 3 recites, further comprising denying access of the computing device attempting to access the server when the biometric data matches previously recorded biometric data.

6. A method as claim 3 recites, further comprising:
    identifying a pattern in input data corresponding to human interaction with the web page;
    identifying that at least some of the biometric data is inconsistent with the pattern in the input data corresponding to the human interaction with the web page.

7. A method as claim 6 recites, further comprising providing a Completely Automated Public Turing test to tell Computers and Humans Apart (CAPTCHA) to the computing device attempting to access the server when the at least some biometric data is inconsistent with the pattern of human interaction with the web page.

8. A method as claim 6 recites, further comprising denying access of the computing device attempting to access the server when the at least some biometric data is inconsistent with the pattern of human interaction with the web page.

9. A method as claim 1 recites, further comprising:
    identifying that at least some of the biometric data matches previously recorded biometric data;
    comparing a portion of the biometric data in addition to the at least some of the biometric data to the previously recorded biometric data; and
    denying access to the computing device attempting to access the server when the at least some biometric data and the portion of the biometric data match previously recorded biometric data.

10. A method as claim 1 recites, further comprising:
    identifying a pattern in input data corresponding to human interaction with the web page; and
    identifying that at least some of the biometric data is inconsistent with the pattern in the input data corresponding to the human interaction with the web page.

11. A method as claim 10 recites, further comprising providing a Completely Automated Public Turing test to tell Computers and Humans Apart (CAPTCHA) to the computing device attempting to access the server when the at least some biometric data is inconsistent with the pattern of human interaction with the web page.

12. A method as claim 10 recites, further comprising denying access of the computing device attempting to access the server when the at least some biometric data is inconsistent with the pattern of human interaction with the web page.

13. A method as claim 1 recites, further comprising:
    acquiring interest data from the computing device prior to delivery of issued data from the server to the computing device;
    comparing the interest data to model data relating to human interaction with the computing device; and
    generating a probability value associated with an operator of the computing device.

14. A method as claim 13 recites, wherein the model data comprises at least one of passive model data or active model data.

15. A method as claim 13 recites, wherein the probability value represents an assessment of likelihood that the operator of the computing device interacting with the server is a human being rather than an autonomic computer application.

16. A method as claim 13 recites, further comprising granting access for delivery of issued data if the probability value indicates a greater likelihood that the operator of the computing device is a human.

17. A method as claim 13 recites, further comprising providing a Completely Automated Public Turing test to tell Computers and Humans Apart (CAPTCHA) to the computing device attempting to access the server if the probability value does not indicate a greater likelihood that the operator of the computing device is a human.

18. A method as claim 13 recites, further comprising denying access to issued data from the server if the probability value indicates a greater likelihood that the operator of the computing device is an autonomic computer application.

19. A method as claim 13 recites, wherein the model data relating to human interaction with the computing device is recorded prior to a time in which the interest data is acquired.

20. A method as claim 13 recites, wherein at least some of the issued data is in response to a request issued by the computing device.

* * * * *

Disclaimer

10,423,885 B2 - Timothy P. Heikell, Renton, WA (US). SYSTEMS, METHODS AND APPRATUS FOR EVALUATING STATUS OF COMPUTING DEVICE USER. Patent dated September 24, 2019. Disclaimer filed September 7, 2022, by the inventor.

I hereby disclaim the following complete claims 1, 2, 10 and 12 of said patent.

*(Official Gazette, March 14, 2023)*